(12) United States Patent
Raimbault et al.

(10) Patent No.: US 10,018,279 B2
(45) Date of Patent: Jul. 10, 2018

(54) FLUID CONTROL DEVICE

(71) Applicant: MANN+HUMMEL GMBH, Ludwigsburg (DE)

(72) Inventors: Vincent Raimbault, Cosmes (FR); Pascal Noiseau, Saint Ouen des Toits (FR); Christophe Voegele, Sace (FR); Maxime Sarrazin, Entrammes (FR); Jérôme Migaud, Vitré (FR)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 15/417,573

(22) Filed: Jan. 27, 2017

(65) Prior Publication Data
US 2017/0219105 A1 Aug. 3, 2017

(30) Foreign Application Priority Data

Jan. 28, 2016 (EP) .................................... 16290021

(51) Int. Cl.
| | | |
|---|---|---|
| *F16K 11/087* | (2006.01) | |
| *F16K 27/06* | (2006.01) | |
| *F02B 37/16* | (2006.01) | |
| *F16K 5/06* | (2006.01) | |

(52) U.S. Cl.
CPC ............ *F16K 11/087* (2013.01); *F02B 37/16* (2013.01); *F16K 27/067* (2013.01); *F16K 5/0689* (2013.01); *F16K 11/0876* (2013.01)

(58) Field of Classification Search
CPC .................................................. F16K 27/067

USPC ........................................ 137/625.46–625.47
See application file for complete search history.

(56) References Cited

U.S. PATENT DOCUMENTS

| 2,492,140 | A | * | 12/1949 | Fike | .................... | F16K 11/0876 |
| | | | | | | 137/625.11 |
| 2,967,042 | A | * | 1/1961 | Richter | ................. | F16K 5/0214 |
| | | | | | | 251/181 |
| 3,108,779 | A | * | 10/1963 | Anderson | ............... | F16K 25/00 |
| | | | | | | 251/175 |
| 3,235,224 | A | * | 2/1966 | Grove | ................... | F16K 3/0227 |
| | | | | | | 251/174 |
| 3,372,901 | A | * | 3/1968 | Manor | .................. | F16K 5/0668 |
| | | | | | | 251/315.05 |
| 3,445,087 | A | * | 5/1969 | Davies | ................. | F16K 5/0636 |
| | | | | | | 251/172 |
| 4,163,544 | A | * | 8/1979 | Fowler | .................. | F16K 5/0673 |
| | | | | | | 251/315.08 |

(Continued)

FOREIGN PATENT DOCUMENTS

WO 94/00708 A1 1/1994

*Primary Examiner* — John Fox
(74) *Attorney, Agent, or Firm* — James Hasselbeck (57) ABSTRACT

A fluid control device (100) having a housing (10) with at least one first port (16) and at least one second port (18, 20), wherein a valve body (30) is enclosed in the housing (10), the valve body (30) providing a fluid path (60) having a first path portion (62) proximal to the first port (16) and an opposing second path portion (64) in a distance from the first port (16) and proximal to the at least one second port (18, 20), the fluid path (60) being switchable between at least a first position (80) and at least a second position (82) in relation to the at least one second port (18, 20) by rotating the valve body (30) around the first main axis (22) of the at least one first port (16).

10 Claims, 5 Drawing Sheets

(56) References Cited

U.S. PATENT DOCUMENTS

| | | | | |
|---|---|---|---|---|
| 4,260,131 | A | * | 4/1981 | Kindersley ........... F16K 27/067 251/214 |
| 4,441,524 | A | * | 4/1984 | Mese ................... F16K 5/0689 137/625.47 |
| 4,552,334 | A | * | 11/1985 | Tomiyama ............... C21O 5/48 137/240 |
| 4,685,488 | A | * | 8/1987 | Corbin .................... F16K 5/201 137/328 |
| 5,906,224 | A | * | 5/1999 | Tupper ................ F16K 11/0876 137/625.47 |
| 5,927,687 | A | * | 7/1999 | Krause ................. F16K 5/0689 222/368 |
| 2013/0048892 | A1 | | 2/2013 | Winterholler |

* cited by examiner

FLUID CONTROL DEVICE

TECHNICAL FIELD

The invention relates to a fluid control device, in particular to an air intake shifter for air ducts of internal combustion engines of vehicles, more particularly, it relates to a charge air duct for a turbocharged engine, such as a one-stage turbocharged engine.

BACKGROUND

Charge air within the meaning of the invention shall be understood as compressed air, compressed by an exhaust turbocharger or any other kind of charger.

For turbocharged engines, geometry (diameter and length) of charge air ducts (also called charge air delivery ducts) is tuned to take benefits from pressure waves for improving the air filling into the engine cylinders, and thus performance.

However, optimal geometry of charge air ducts is dependent on engine speed. At low engine speeds, for instance below around 2000 rpm (revolutions per minute), and high load, the turbocharger compresses the supplied air in an effective manner. Under these engine operating conditions, a charge air duct of small length and larger diameter is suitable in order to reduce pressure loss and increase the engine power.

At low engine speeds (around 1250 rpm for instance) and part load operation, the turbocharger compressor is not very effective (the charging effect of the turbocharger is poor and limits the engine output torque). Under these engine operating conditions, a longer duct having a reduced inlet diameter is appropriate in order to increase the engine feeding (i.e. the mass of gas introduced into the combustion chamber) and thus the volumetric efficiency.

Conventional charge air ducts have a fixed length, which is a trade off between engine torque and power. With a charge air duct of fixed length, the engine performance is optimized at a specific engine speed, but not on a large operating range. Also, because of harsh environmental requirements in the automotive sector, aiming to reduce fuel consumption and $CO_2$ emissions, there is a great demand for increase in the engine output torque of a turbocharged engine in the low engine speed range.

Therefore it is desirable for optimal engine control to have the possibility to change the air inlet of a combustion engine between different air duct branches according to engine speed and load condition.

DE10314629A1 discloses an induction system for an internal combustion engine which has a rotary valve directing the incoming fuel/air mixture either through a short wide induction pipe or a narrow long induction pipe. The fuel/air mixture passes through an inlet channel into a chamber with several short wide tubes and long narrow tubes leading to the individual cylinders. A rotary valve body forms part of a valve assembly and is accommodated in a cylindrical housing. The housing has a wide opening for each cylinder and a narrow opening. The valve body is rotated to line up wide or narrow passages with the entry port for each cylinder.

SUMMARY

It is an object of the invention to provide a fluid control device, in particular an air intake shifter for air ducts, which is reliable, compact, cheap to manufacture and easy to assemble, and which can easily be adapted to different engine operating modes.

This object is achieved by a fluid control device, comprising a housing with at least one first port having a first main axis and at least one second port having a second main axis. A valve body is enclosed in the housing, the valve body being arranged between the at least one first port and the at least second port. The valve body is providing a fluid path having a first path portion proximal to the first port and an opposing second path portion in a distance from the first port and proximal to the at least one second port, the fluid path being switchable between at least a first position and at least a second position by rotating the valve body around the first main axis of the at least one first port. A first sealing means is provided at the first path portion and a second sealing means is provided at the second path portion.

The claims, the description and the drawings describe advantageous embodiments of the invention.

According to a first aspect of the invention a fluid control device, in particular an air intake shifter, is proposed, which is comprising a housing with at least one first port having a first main axis and at least one second port having a second main axis.

A valve body is enclosed in the housing, the valve body being arranged between the at least one first port and the at least second port. The valve body is providing a fluid path having a first path portion proximal to the first port and an opposing second path portion in a distance from the first port and proximal to the at least one second port, the fluid path being switchable between at least a first position and at least a second position in by rotating the valve body around the first main axis of the at least one first port.

A first sealing means is provided at the first path portion and a second sealing means is provided at the second path portion. The first sealing means have a first first-sealing-means interface portion for cooperating with the valve body and a second first-sealing-means interface portion for cooperating with the housing, and the second sealing means have a second second-sealing-means interface portion for cooperating with the valve body and a first second-sealing-means interface portion for cooperating with the housing.

The valve body is provided with a first valve-body interface portion for cooperating with the first first-sealing-means interface portion, one of which being configured as a spherical interface and one of which being configured as a conical or a spherical interface.

The valve body is provided with a second valve-body interface portion for cooperating with the second second-sealing-means interface portion, one of which being configured as a spherical interface and one of which being configured as a conical or a spherical interface.

Spherical interfaces may be realized as spherically shaped interface portions, whereas conical interfaces may realized as conically shaped interface portions.

The housing is provided with a first housing interface portion for cooperating with the second first-sealing-means interface portion and a second housing interface portion for cooperating with the first second-sealing-means interface portion, one of the second housing interface portion and the first second-sealing-means interface portion being configured as a spherical interface and one being configured as a conical or a spherical interface.

The invention is related to a special shape of contact between a port of a housing of a fluid control device and a valve body comprising fluid path for guiding a fluid. The special shape of contact between the different parts is able to ensure both tolerance compensation and sealing. Due to two parts with complementary spherical contacts, the fluid control device is able to keep two accurate contacts between three parts and compensate tolerances due to manufacturing processes as well as assembling. Thus a fluid tight connection between the different parts of the fluid control device is provided. Either angular or linear tolerances may be addressed for compensating tolerances of the different parts of the fluid control device. Better compensation of the tolerances is ensured as well as an easier assembling process. Further less components are needed for ensuring a tight connection of the different parts of the fluid control device. Due to the invention, e.g., contact between a sphere and a cone ensures fluid tightness and tolerance compensation.

Control means comprising the valve body are enabling the fluid flow between the first port and the at least one second port by connecting the first and the second port via the fluid path. The flow direction of the fluid can be from the second port to the first port or alternatively from the first port to the second port.

The proposed inventive fluid control device deals with a product which is able to shift a fluid flow path from a first port to at least one second port while keeping the pressure losses of the fluid during passage through the fluid control device low. This exhibits a significant advantage over current fluid control devices according to state of the art using flaps or valves with axles in the main path of the fluid flow which create high level of fluid pressure drops even at open positions of the fluid path, where even at open positions the axles and the flaps are remaining in the middle or near the middle of the fluid path. The inventive fluid control device on the contrary is able to withstand high fluid pressures and high levels of fluid pulsation without significant losses of fluid pressure. Further the fluid control device is characterized by a high level of fluid tightness at the end positions of a valve body of the control means.

The inventive fluid control device may be favorably used as an air intake shifter for air ducts of internal combustion engines of vehicles if the ports of the fluid control device are connected to two inlets and one outlet of the air duct, for instance. Thus it may be part of an active charge air duct, like a charge air cooler bypass. An air intake shifter may comprise the fluid control device, having a first port, and two second ports, wherein the first port is alternatively coupleable to the first second port or another second port by a control means, which is rotatable about a main axis of the first port, which main axis is perpendicular to the cross section of the first port. A switching or shifting behavior of the fluid control device may be realized where the fluid path is open from the first port to the first second port in one position, whereas the fluid path from the first port to the first second port is closed in a second position. If the housing carries another second port, in the second position the fluid path may be open from the first port to the further second port. This is the realization of an air intake shifter, for instance, where the air inlet to a combustion engine is shifted between different air ducts, from a charge air duct optimized for low pressure loss and for engine power to a pulsating air duct optimized for torque increase, for instance.

Alternatively the inventive fluid control device may also be favorably used for guiding cooling liquids like e.g. water. The fluid control device also may exhibit one inlet and several outlets, or alternatively one outlet and several inlets, located around the main rotation shaft of the fluid control device. Inlets and outlets may be located in different housing parts.

The valve body of the control means of the inventive fluid control device is able to rotate around the first main axis of the first port, thus an axle of the valve body does not cause any significant pressure drop of the fluid flow as it is directed in the fluid flow direction. The fluid path, which may be manufactured by drilling the valve body in order to provide a unique fluid path inside the valve body, is always connected and open to the first port, whereas the other side of the fluid path is either connected and open to a first second port or by rotating the valve body to another second port. Alternatively the fluid path may be partly open to both second ports, thus providing a partly open connection from the second ports to the first port and mixing the fluid flows from both second ports when feeding to the first port.

Advantageously, the first port may be an air outlet and the first second port may be an air inlet for charge air and the other second port may be an air inlet for pulsating air. The charge air may be generated by a turbocharger, whereas the pulsating air may be generated by a resonance device. Thus it is possible to get more air into a combustion engine, to achieve a higher level of pulsation and to increase an engine efficiency. Different load conditions of combustion engines may be optimized by an optimized supply of air for the combustion process. The fluid control device can thus be used for a shifting of the air inlet according to the load conditions of the combustion engine. Shifting may be achieved dependent on specific engine speeds.

In a further alternative, if the fluid control device exhibits only one second port, it can be used to open or close the second port in order to work as a shutter for the second port. Thus the inventive fluid control device may be used as a fluid shutter. A shutter behavior of the fluid control device may be realized where the fluid path is open from the first port to the second port in one position of a valve body, whereas the fluid path from the first port to the second port is closed in a second position.

Advantageously the first valve-body interface portion may be configured as a spherical interface and the first first-sealing-means interface portion may be configured as a conical interface. The fluid tightness may be ensured by a reliable sealing behavior, which is achievable, if the first valve-body interface portion with a spherical shape is pressed against the first first-sealing-means interface portion with a conical shape.

Due to another favorable embodiment the second valve-body interface portion may be configured as a spherical interface and the second second-sealing-means interface portion may be configured as a conical interface. The fluid tightness may be ensured by a reliable sealing behavior, which is achievable, if the second valve-body interface portion with a spherical shape is pressed against the second second-sealing-means interface portion with a conical shape.

According to an advantageous embodiment the second housing-interface portion may be configured as a spherical interface and the first second-sealing-means interface portion may be configured as a conical interface. The fluid tightness may be ensured by a reliable sealing behavior, which is achievable, if the second housing-interface portion with a spherical shape is pressed against the first second-sealing-means interface portion with a conical shape.

Favorably the first main axis and the at least one second main axis may be aligned off-axis to one another. Thus the first port and the second port are located not on a straight line which enables to rotate the valve body around the first main axis and connect the fluid path in the valve body to another second port which is located on a different second main axis.

The fluid path thus is bent at a certain angle and may be connected to the other second port.

In an advantageous embodiment the valve body may have at least one outer surface section having a spherical shape. The spherical shape of the outer surface of the valve body enables to rotate the valve body around the first main axis inside the housing and still keep the sealing conditions for fluid tightness in a reliable way. Especially if the housing exhibits a complementary spherical inner surface rotation around the first main axis is favorably achievable. Further, if the valve body is constructed as a sphere or at least part of the valve body is realized as a part of a sphere, where the valve body may be of generally spherical shape, but with edges and recesses, it is quite convenient and efficient to rotate it around the main axis of the first port. The moment of inertia can thus be kept quite low thus enabling to rotate the valve body at a high speed and with a low activating torque.

Due to a further favorable embodiment at least a section of an inner surface of the housing may have a spherical shape corresponding to the outer surface section of the valve body. Thus sealing of the valve body against the housing can be achieved very efficiently and reliably with low friction values of the valve body to the inner surface of the housing.

Due to an advantageous embodiment the housing may comprise at least a first half shell and a second half shell. This enables convenient assembly conditions, because thus the valve body may be inserted into one of the half shells, then the other half shell may be put on top of the valve body and the first half shell and finally both half shells may be closed and tightened by screws or the like. Alternatively both half shells may be welded, e.g. by spin welding or gas welding, together. This also exhibits a very modular construction of the fluid control device, because by changing one of the two half shells, where the first half shell, for instance, carries the first port and the second shell carries the second port, an alternative type of fluid control device may be assembled, exhibiting different ports concerning mechanical interfaces or a different number of ports or changing the fluid control device from an air intake shifter to a shutter or vice versa.

Advantageously the valve body may be rotatable by action of a driving mechanism located outside the housing. A rotating axle of the valve body may be fed through the housing in order to be coupled to an actuator as a driving mechanism of the control means of the fluid control device. Such an actuator can be a vacuum actuator, e.g., which is a very common type of actuator in combination with combustion engines, particularly in vehicles. Alternatively an electric actuator can be used for rotating the valve body.

In an advantageous embodiment the housing and/or the valve body may be made of plastics materials. Plastics materials, such as a thermoplastic material, like PTFE, e.g., are not only very convenient for manufacturing different shapes of devices, but are also a cheap and flexible way of producing in a high output. Further it is advantageous to use, for instance, a PTFE segment for the sealing area of the valve body and as a counterpart other plastics materials for the corresponding inner surface of the housing.

Thus a very efficient and reliable sealing function is achievable in an economic way, which exhibits also low friction between the sealing counterparts.

BRIEF DESCRIPTION OF THE DRAWINGS

The present invention together with the above-mentioned and other objects and advantages may best be understood from the following detailed description of the embodiments, but not restricted to the embodiments, wherein is shown in.

DETAILED DESCRIPTION

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

Figure 1:
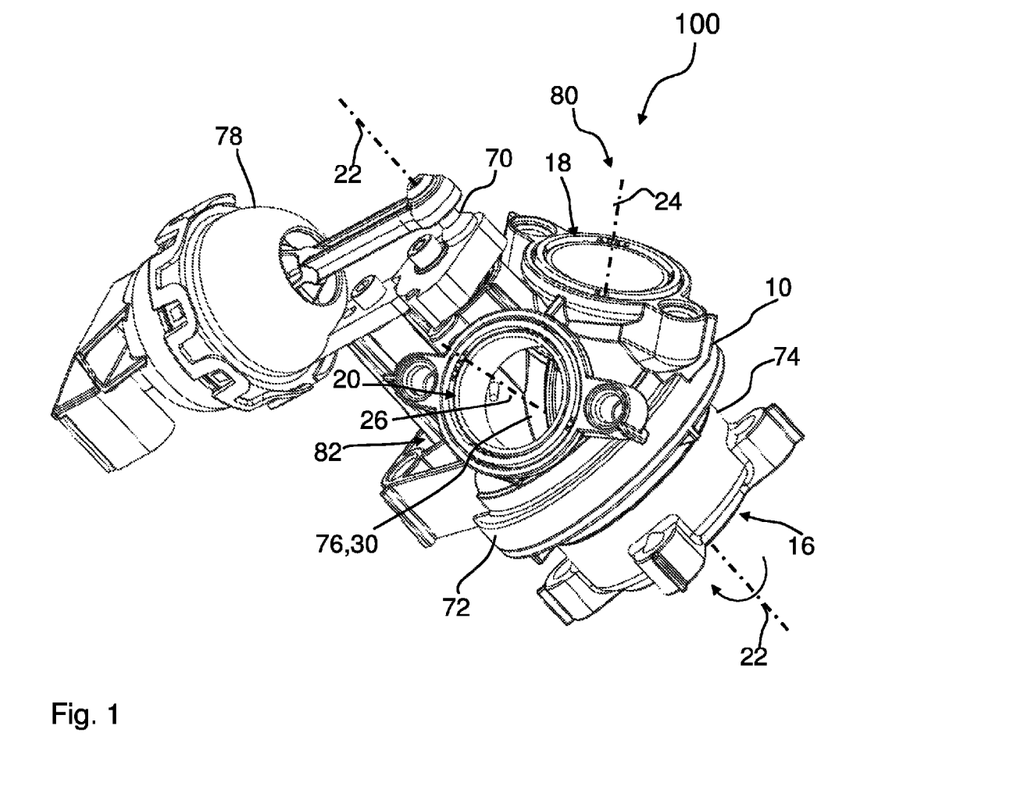
FIG. 1 in an isometric view a first example embodiment of a fluid control device according to the invention in a first position of a valve body of a control means where a fluid path is open from a first port to a second port.
Figure 2:
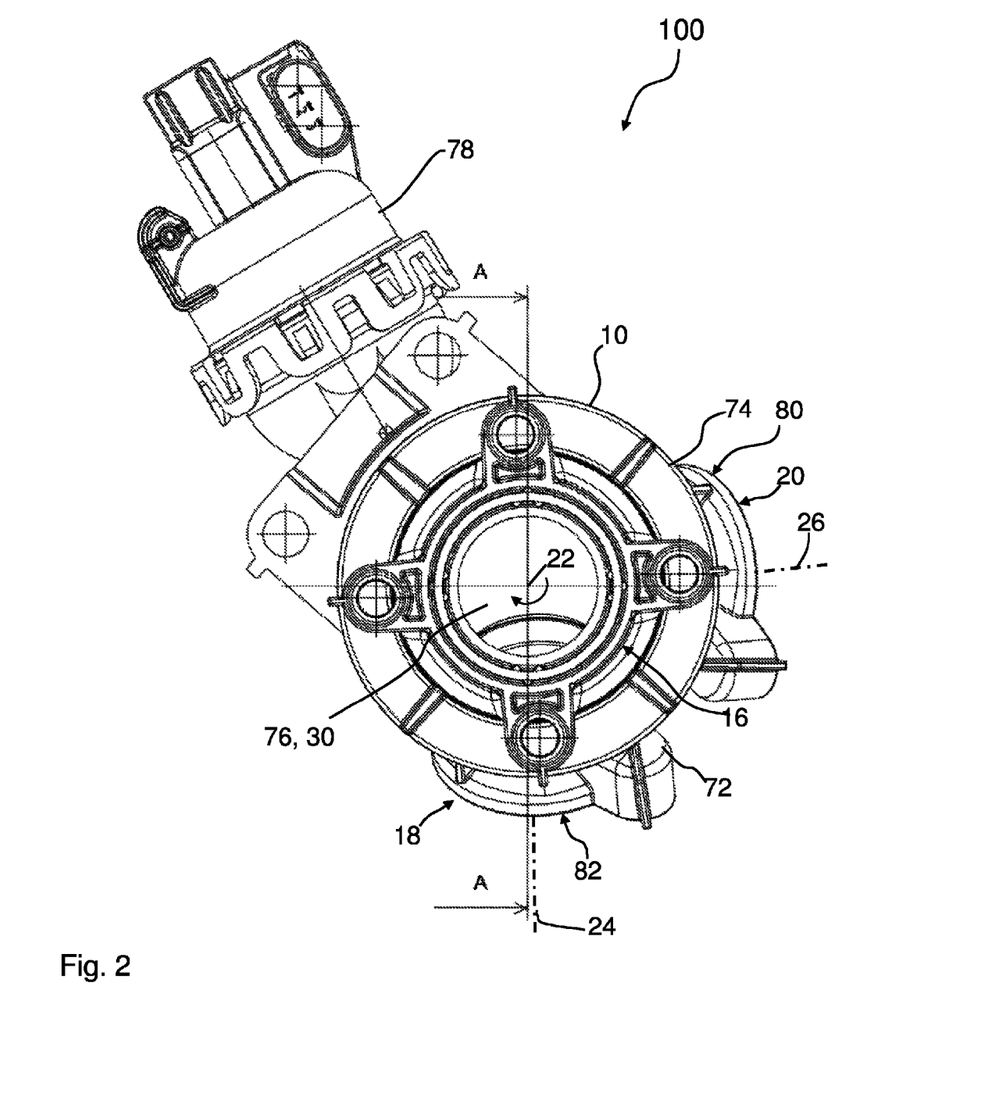
FIG. 2 in a view on the first port the example embodiment of FIG. 1.
Figure 3:
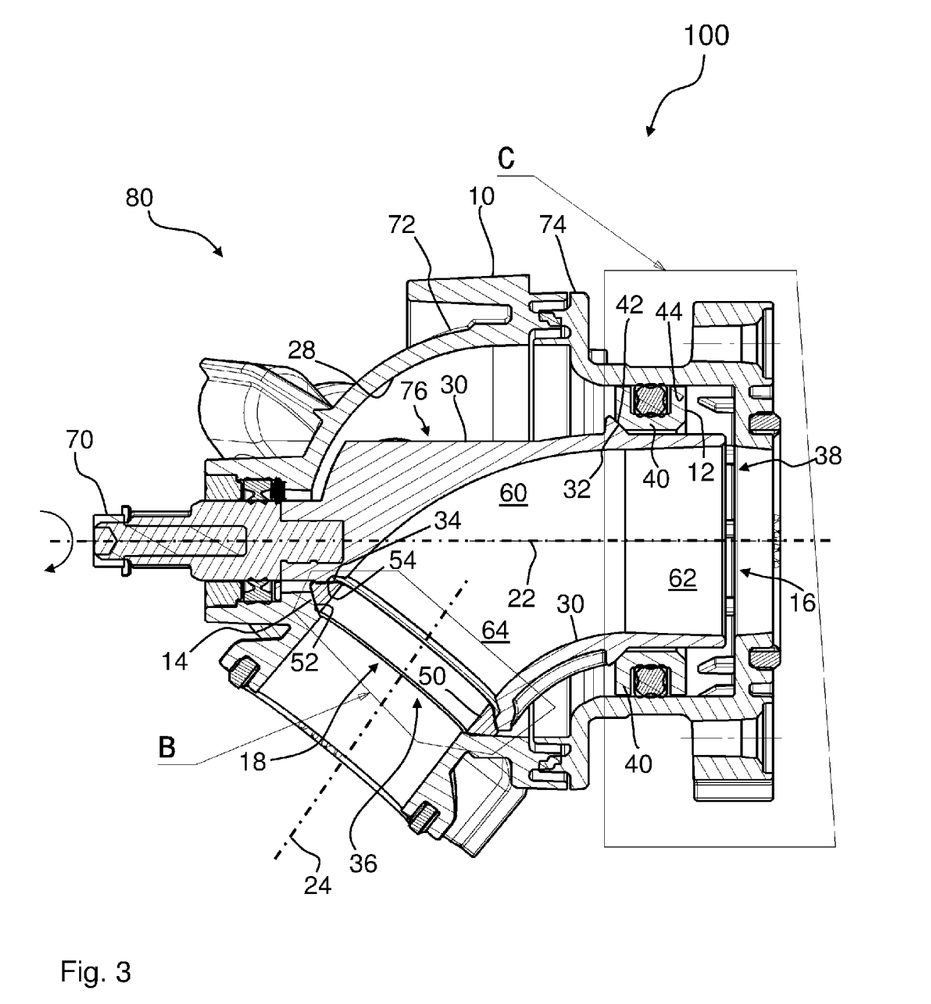
FIG. 3 in a cross cut view along the section plane A-A, as indicated in FIG. 2, the example embodiment of the fluid control device according to FIG. 1.

FIG. 1 depicts in an isometric view a first example embodiment of a fluid control device 100 according to the invention in a first position 80 of the valve body 30 of a control means 76 where the fluid path 60 is open from the first port 16 to the second port 18, whereas in FIG. 2 a view on the first port 16 of the fluid control device 100 is shown and in FIG. 3 depicts a cross cut view of the fluid control device 100 along the section plane A-A, as indicated in FIG. 2.

The first port 16 may represent an output opening 38 of the fluid control device 100, whereas the second port 18 may represent an input opening 36 for the fluid flow. Yet input and output of the fluid control device 100 may also be the other way round.

The fluid control device 100 comprises the housing 10 with the first port 16 having the first main axis 22 and the second ports 18, 20 having the second main axes 24, 26. The first main axis 22 and the second main axis 24 are aligned off-axis to one another, such that a certain angle is formed between the two axes 22, 24.

The valve body 30 is enclosed in the housing 10 and arranged between the first port 16 and the second port 18. The valve body 30 provides the fluid path 60 for guiding a fluid between the first and the second port 16, 18 which has a first path portion 62 proximal to the first port 16 and an opposing second path portion 64 in a distance from the first port 16 and proximal to the second port 18, as may be seen in FIG. 3.

If the valve body 30 with the fluid path 60 is rotated from the first position 80 to the second position 82, the fluid path 60 is connecting the first port 16 with the second port 20, characterized by the second main axis 26.

The fluid path 60 is switchable between the first position 80 related to the second port 18 and a second position 82 related to another second port 20 by rotating the valve body 30 around the first main axis 22 of the at least one first port 16. The first position 80 may open the second port 18 so that a fluid can flow between the first and the second ports 16, 18.

The second position 82 may close the second port 18 and open another second port 20 so that a fluid can flow between the first and the second ports 16, 20. It may also be possible to establish a mix between e.g. a flow between the first port 16 and both second ports 18, 20 by selecting an appropriate position of the fluid path 60.

FIG. 3 depicts the first sealing means 40 being provided at the first path portion 62 and the second sealing means 50 being provided at the second path portion 64. The first sealing means 40 has the first first-sealing-means interface portion 42 for cooperating with the valve body 30 and the second first-sealing-means interface portion 44 for cooperating with the housing 10. The second sealing means 50 has the second second-sealing-means interface portion 54 for cooperating with the valve body 30 and the first second-sealing-means interface portion 52 for cooperating with the housing 10.

The valve body 30 is provided with the first valve-body interface portion 32 for cooperating with the first first-sealing-means interface portion 42, one of the first interface portions 32, 42 being configured as a spherical interface with a spherical shape and the other one of the first interface portions 42, 32 being configured as a conical or a spherical interface with a conical shape or a spherical shape, respectively. The valve body 30 is provided with the second valve-body interface portion 34 for cooperating with the second second-sealing-means interface portion 54, wherein one of the second interface portions 34, 54 has a spherical shape and the other one of the second interface portions 54, 34 has a conical shape or a spherical shape.

The housing 10 is provided with the first housing interface portion 12 for cooperating with the second first-sealing-means interface portion 44 and the second housing interface portion 14 for cooperating with the first second-sealing-means interface portion 52, wherein one of the second housing interface portion 14 and the first second-sealing-means interface portion 52 has a spherical shape and the other one has a conical shape or a spherical shape.

The valve body 30 has at least one outer surface section having a spherical shape, corresponding to at least a section of the inner surface 28 of the housing 10, which has a spherical shape corresponding to the outer surface section of the valve body 30. Thus a reliable rotation movement of the valve body 30 inside the housing 10 is achieved.

The housing 10 comprises at least a first half shell 72 and a second half shell 74, in order to be favorably assembled together with the valve body 30 inside the housing 10. As the housing 10 and/or the valve body 30 may be made of plastics materials the two half shells 72, 74 may be favorably joined, e.g. by welding the housing.

The valve body 30 is rotatable by action of a driving mechanism 78 located outside the housing 10 around the rotation axle 70. The rotating axle 70 of the valve body 30 is fed through the housing 10 in order to be coupled to an actuator as a driving mechanism 78 of the control means 76 of the fluid control device 100. Such an actuator can be a vacuum actuator, e.g., which is a very common type of actuator in combination with combustion engines, particularly in vehicles. Alternatively an electric actuator can be used for rotating the valve body 30.

Figure 4:
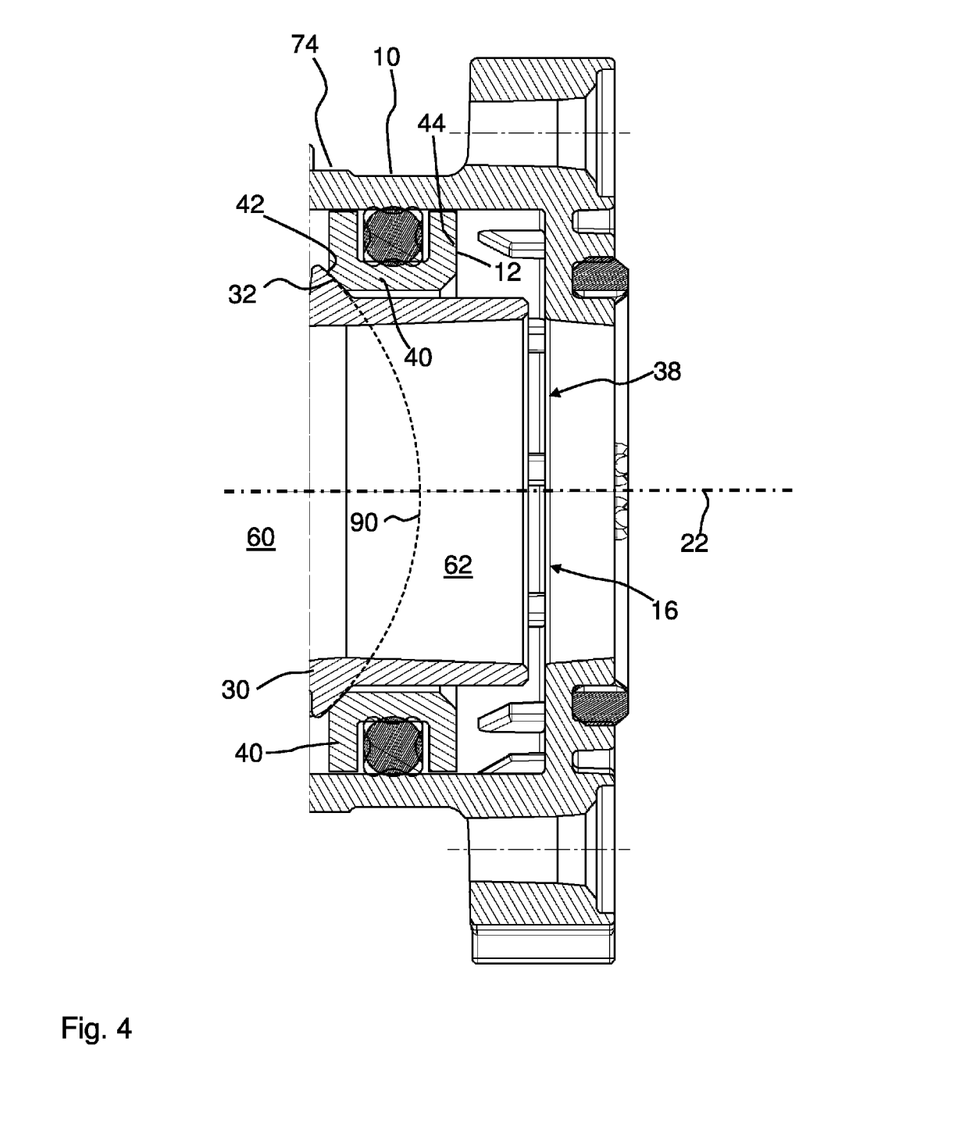
FIG. 4 in a cross cut view the example embodiment of the fluid control device according to FIG. 1 with a more detailed view of the first port and the first sealing means in section C of FIG. 3.

FIG. 4 depicts in a cross cut view the example embodiment of the fluid control device 100 according to FIG. 1 with a more detailed view of the first port 16 and the first sealing means 40, as is marked in FIG. 3 by the section C. The first sealing means 40 is provided at the first path portion 62. The first sealing means 40 has the first first-sealing-means interface portion 42 for cooperating with the valve body 30 and the second first-sealing-means interface portion 44 for cooperating with the housing 10. The valve body 30 is provided with the first valve-body interface portion 32 for cooperating with the first first-sealing-means interface portion 42, wherein one of the first interface portions 32, 42 has a spherical shape and the other one of the first interface portions 42, 32 has a conical shape or a spherical shape. The housing 10 is provided with the first housing interface portion 12 for cooperating with the second first-sealing-means interface portion 44. The first valve-body interface portion 32 has a spherical shape, which is demonstrated with a segment of the circle line 90 in FIG. 4, and the first first-sealing-means interface portion 42 has a conical shape. The segment of the circle line 90 represents the line of intersection of a respective sphere with the plane of projection shown in the Figure. The center of the sphere is located on the first main axis 22.

Thus a reliable sealing behavior between valve body 30 and first sealing means 40 can be achieved. Alternatively both sealing partners, valve-body interface portion 32 and the first first-sealing-means interface portion 42 may exhibit spherical shapes.

Figure 5:
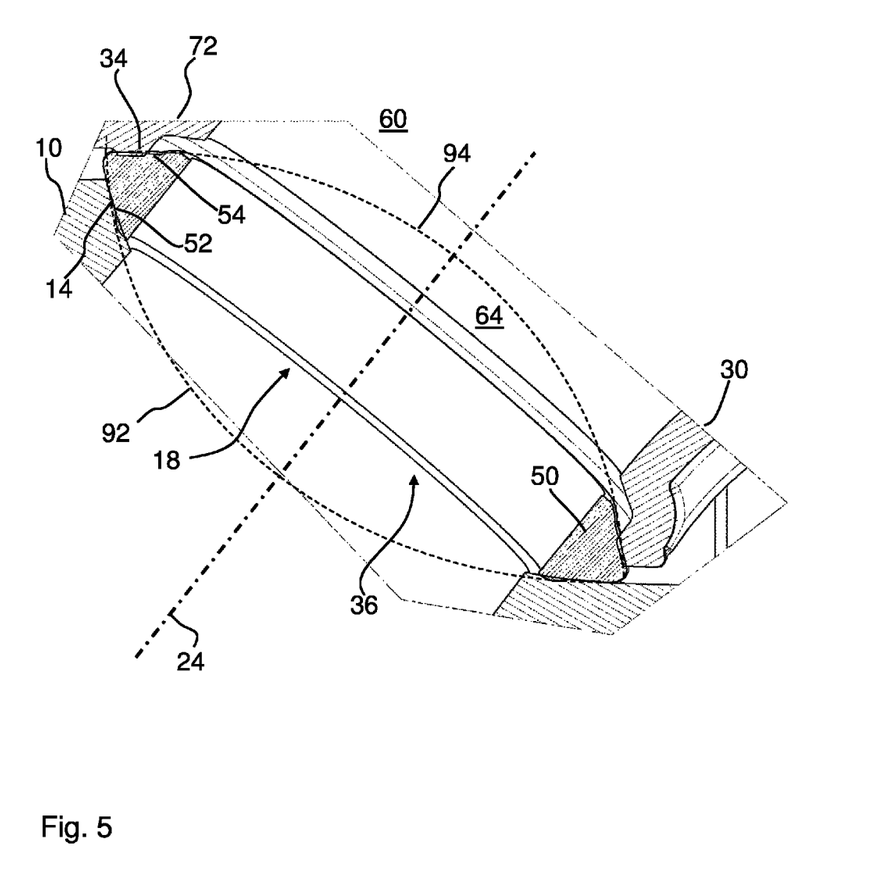
FIG. 5 in a cross cut view the example embodiment of the fluid control device according to FIG. 1 with a more detailed view of the second port and the second sealing means in section B of FIG. 3.

FIG. 5 depicts in a cross cut view the example embodiment of the fluid control device 100 according to FIG. 1 with a more detailed view of the second port 18 and the second sealing means 50 as is marked in FIG. 3 by the section B. The second sealing means 50 has the second second-sealing-means interface portion 54 for cooperating with the valve body 30 and the first second-sealing-means interface portion 52 for cooperating with the housing 10. The valve body 30 is provided with the second valve-body interface portion 34 for cooperating with the second second-sealing-means interface portion 54, wherein one of the second interface portions 34, 54 has a spherical shape and the other one of the second interface portions 54, 34 has a conical shape or a spherical shape. The housing 10 is provided with the second housing interface portion 14 for cooperating with the first second-sealing-means interface portion 52, wherein one of the second housing interface portion 14 and the first second-sealing-means interface portion 52 has a spherical shape and the other one has a conical shape or a spherical shape.

In the example embodiment shown in FIG. 5, the second housing interface portion 14 as well as the second valve-body interface portion 34 exhibit a spherical shape, demonstrated by the circle lines 92, 94, respectively, whereas their counterparts, the first second-sealing-means interface portion 52 and second second-sealing-means interface portion 54, respectively exhibit conical shapes. The segments of the circle lines 92, 94 represent the lines of intersection of respective spheres with the plane of projection shown in the Figures. The centers of the spheres are located on the second main axis 24.

Thus a reliable sealing behavior between valve body 30 and second sealing means 50, as well as between second sealing means 50 and housing 10 can be achieved. Alternatively the sealing partners second valve-body interface portion 34 and second second-sealing-means interface portion 54, as well as the sealing partners first second-sealing-means interface portion 52 and second housing interface portion 14 may exhibit spherical shapes.

What is claimed is:
1. A fluid control device (100) comprising:
 a housing (10) with at least one first port (16) having a first main axis (22); and
  at least one second port (18, 20) having a second main axis (24, 26),

(i) wherein a valve body (30) is enclosed in the housing (10), the valve body (30) being arranged between the at least one first port (16) and the at least second port (18, 20), (ii) the valve body (30) providing a fluid path (60) having a first path portion (62) proximal to the first port (16) and an opposing second path portion (64) in a distance from the first port (16) and proximal to the at least one second port (18, 20), the fluid path (60) being switchable between at least a first position (80) and at least a second position (82) by rotating the valve body (30) around the first main axis (22) of the at least one first port (16), (iii) wherein a first sealing means (40) is provided at the first path portion (62) and a second sealing means (50) is provided at the second path portion (64), (iv) the first sealing means (40) having a first first-sealing-means interface portion (42) for cooperating with the valve body (30) and a second first-sealing-means interface portion (44) for cooperating with the housing (10), and the second sealing means (50) having a second second-sealing-means interface portion (54) for cooperating with the valve body (30) and a first second-sealing-means interface portion (52) for cooperating with the housing (10), (v) wherein the valve body (30) is provided with a first valve-body interface portion (32) for cooperating with the first first-sealing-means interface portion (42), one of which being configured as a spherical interface and one of which being configured as a conical or a spherical interface, (vi) wherein the valve body (30) is provided with a second valve-body interface portion (34) for cooperating with the second second-sealing-means interface portion (54), one of which being configured as a spherical interface and one of which being configured as a conical or a spherical interface, (vii) and wherein the housing (10) is provided with a first housing interface portion (12) for cooperating with the second first-sealing-means interface portion (44) and a second housing interface portion (14) for cooperating with the first second-sealing-means interface portion (52), one of the second housing interface portion (14) and the first second-sealing-means interface portion (52) being configured as a spherical interface and the other one being configured as a conical or a spherical interface.

2. The fluid control device according to claim 1, wherein the first valve-body interface portion (32) is configured as a spherical interface, and
wherein the first first-sealing-means interface portion (42) is configured as a conically.

3. The fluid control device according to claim 1, wherein the second valve-body interface portion (34) is configured as a spherical interface, and
wherein the second second-sealing-means interface portion (54) is configured as a conical interface.

4. The fluid control device according to claim 1, wherein the second housing-interface portion (14) is configured as a spherical interface, and
wherein the first second-sealing-means interface portion (52) is configured as a conical interface.

5. The fluid control device according to claim 1, wherein the first main axis (22) and the at least one second main axis (24, 26) are aligned off-axis to one another.

6. The fluid control device according to claim 1, wherein the valve body (30) has at least one outer surface section having a spherical shape.

7. The fluid control device according to claim 1, wherein at least a section of an inner surface (28) of the housing (10) has a spherical shape corresponding to the outer surface section of the valve body (30).

8. The fluid control device according to claim 1, wherein the housing (10) comprises at least a first half shell (72) and a second half shell (74).

9. The fluid control device according to claim 1, wherein the valve body (30) is rotatable by action of a driving mechanism located outside the housing (10).

10. The fluid control device according to claim 1, wherein the housing (10) and/or the valve body (30) are made of plastics materials.

* * * * *